United States Patent
Gupta

(10) Patent No.: US 9,916,162 B2
(45) Date of Patent: Mar. 13, 2018

(54) USING A GLOBAL BARRIER TO SYNCHRONIZE ACROSS LOCAL THREAD GROUPS IN GENERAL PURPOSE PROGRAMMING ON GPU

(71) Applicant: Intel Corporation, Santa Clara, CA (US)

(72) Inventor: Niraj Gupta, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 14/563,601

(22) Filed: Dec. 8, 2014

(65) Prior Publication Data

US 2015/0187042 A1  Jul. 2, 2015

(30) Foreign Application Priority Data

Dec. 26, 2013 (IN) ............... 6101/CHE/2013

(51) Int. Cl.
*G06F 15/80* (2006.01)
*G06F 9/38* (2018.01)
*G06F 9/48* (2006.01)

(52) U.S. Cl.
CPC .............. *G06F 9/3851* (2013.01); *G06F 9/48* (2013.01)

(58) Field of Classification Search
CPC ........ G06F 9/522; G06F 9/30087; G06F 8/45; G06F 9/3009; G06F 9/5011
See application file for complete search history.

(56) References Cited

U.S. PATENT DOCUMENTS

| | | | |
|---|---|---|---|
| 2011/0022817 A1* | 1/2011 | Gaster | G06F 9/5044 711/202 |
| 2015/0052537 A1* | 2/2015 | Gaster | G06F 9/3851 718/106 |

OTHER PUBLICATIONS

Lindholm et al. "NVIDIA Tesla: A Unified Graphics and Computing Architecture", IEEE Computer Society, Apr. 2008.*

* cited by examiner

*Primary Examiner* — Hau Nguyen
(74) *Attorney, Agent, or Firm* — Jordan IP Law, LLC

(57) ABSTRACT

Methods and systems may synchronize workloads across local thread groups. The methods and systems may provide for receiving, at a graphics processor, a workload from a host processor and receiving, at a plurality of processing elements, a plurality of threads that from one or more local thread groups. Additionally, the processing of the workload may be synchronized across the one or more thread groups. In one example, the global barrier determines that all threads across the thread groups have been completed without polling.

14 Claims, 4 Drawing Sheets

USING A GLOBAL BARRIER TO SYNCHRONIZE ACROSS LOCAL THREAD GROUPS IN GENERAL PURPOSE PROGRAMMING ON GPU

BACKGROUND

Certain computing applications such as games, media players and the like may utilize processing units, e.g., a central processing unit (CPU), graphics processing units (GPUs), general purpose graphics processing units (GPGPUs), advanced processing units (APUs), and the like, to handle compute intensive workloads. In such a case, a processing unit such as a CPU may dispatch the workloads to, for example, a GPU in the form of one or more commands, wherein the GPU may internally execute multiple threads in response to the commands. The threads executed by the GPU are typically organized in groups called thread groups. Multiple thread groups may need to be executed in order to complete the workload. General purpose programming on GPUs may include the concept of global and local work items. A barrier may be supported across local work items or within a thread group. A barrier, however, across global work items or across thread groups may not be supported by hardware. Such a barrier may require that the execution of all thread groups be completed and synchronized before the next set of workloads can be launched.

BRIEF DESCRIPTION OF THE DRAWINGS

The various novel aspects of the embodiments of the present disclosure will become evident to a person of ordinary skill in the art given the following enabling specification and appended claims, and by referencing the following drawings, in which:

DETAILED DESCRIPTION OF THE DRAWINGS

Present graphics processing units (GPU) can be used for general processing apart from processing graphics workloads such as, for example, Dance Station 3D (3DDX) or Open Graphics Library (OpenGL). OpenCL and Compute Shader (CS) are known programming models used for general purpose processing on the GPU. Both these APIs, OpenCL and CS, utilize the concept of a barrier with a thread group. Any synchronization required for synchronization across thread groups requires the CPU (or GPU) to synchronize all the thread groups to be over before the task which requires multiple thread group data to proceed.

Because present GPUs usually can have multiple thread groups running in parallel within the GPU hardware, there is no means of synchronization except by completion of all the thread groups. In cases where multiple thread groups can fit into the GPU hardware, these multiple thread groups can be active simultaneously. Thus, a global barrier can be used to synchronize between thread groups without requiring them to retire.

Figure 1:
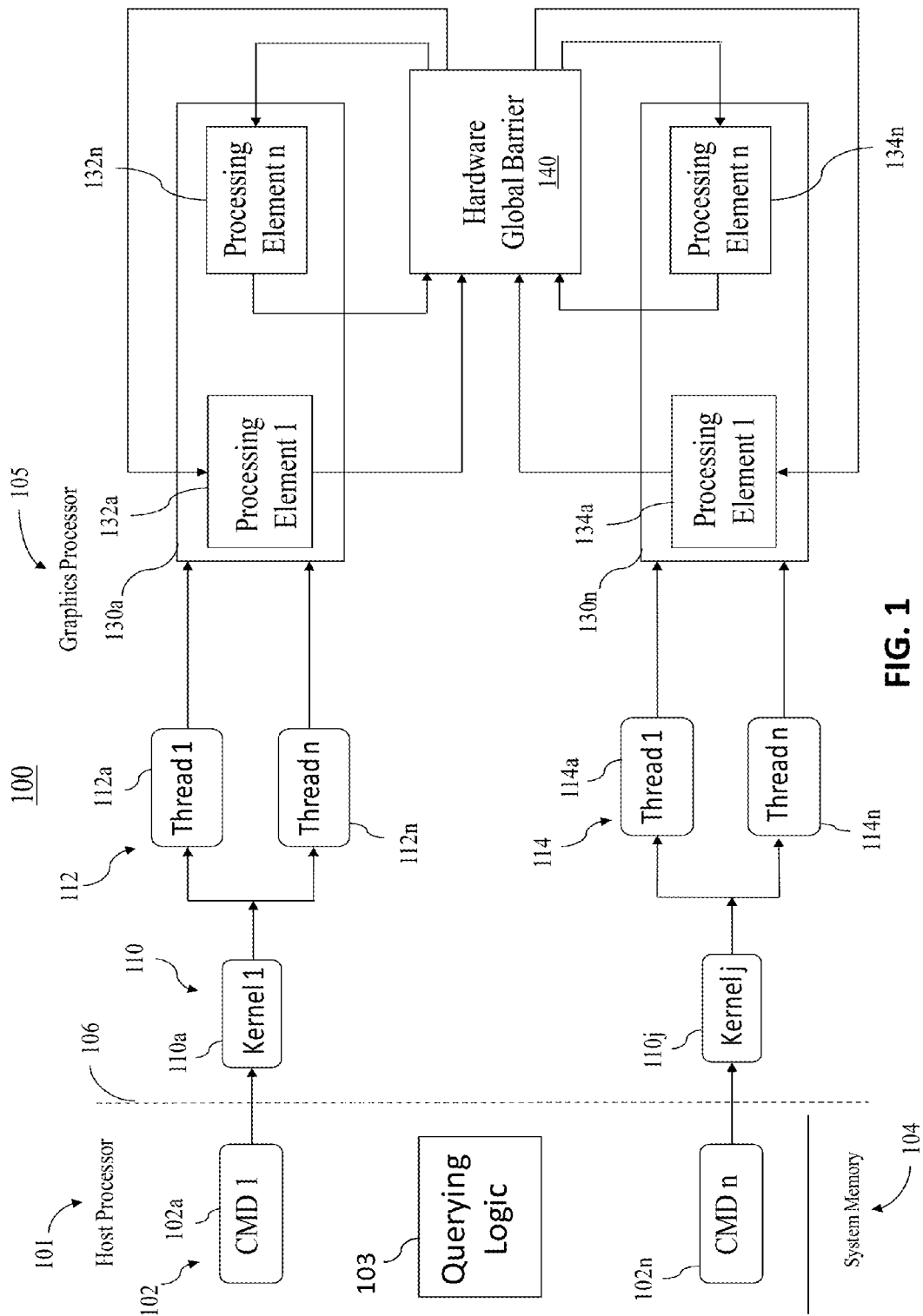
FIG. 1 is a block diagram of an example of a computing architecture according to an embodiment.

FIG. 1 shows an example of a computing architecture 100 in accordance with an embodiment of the present disclosure. The computing architecture 100 may generally be part of a computing platform such as, for example, a smart phone, smart tablet, mobile Internet device (MID), smart television (TV), media player, notebook computer, desktop computer, server, and the like. The illustrated computing architecture 100 includes a host processor 101 coupled to a graphics processor 105 via a bus 106. The bus may be, for example, a PCI Express Graphics (PEG, e.g., Peripheral Components Interconnect/PCI Express x16 Graphics 150W-ATX Specification 1.0, PCI Special Interest Group) bus, Accelerated Graphics Port (e.g., AGP V3.0 Interface Specification, September 2002) bus, and the like, or other bus type or link, that facilitates the transfer of information, commands and/or data between the host processor 101 and the graphics processor 105. In one example, the host processor 101 is a central processing unit (CPU) and the graphics processor 105 is a graphics processing unit (GPU) that may be used as a general purpose GPU (GPGPU).

The host processor 101, in response to a request, may issue a plurality of commands 102 (102a-102n) to the graphics processor 105 in order to process various workloads. In some embodiments, the commands 102 are associated with compute intensive workloads including, for example, image processing tasks related to graphics and/or media playing applications. One or more kernels 110 (110a-110j) may be issued in response to the commands 102 in order to perform the tasks required by the workload. The kernels 110 may issue one or more thread groups, e.g., thread group 112 (112a-112n) and thread group 114 (114a-114n), that represent the workload. Hence, a workload may be reflected in a first command 102a (CMD 1), which causes a kernel 110a on the graphics processor 105 to issue a thread group 112 (112a-112n) for execution of the workload on the graphics processor 105. More particularly, the graphics processor 130 may include one or more groups of processing elements 132a-132n, 134a-134n, etc. Each of the one or more groups of processing elements 132a-132n, 134a-134n may be arranged to form a plurality of local thread groups 130a, 130n, respectively. For example, a first local thread group 130a may be formed by one or more processing elements 132a-132n, a second local thread group 130n may be formed by one or more processing elements 134a-134n, and so on. Accordingly, the one or more local thread groups 130a-130n of the graphics processor 105 may concurrently execute the thread groups 112, 114 as software threads in order to achieve a relatively high amount of parallelism and processing efficiency with regard to the underlying workload.

The processing elements 132a-132n, 134a-134n of graphics processor 105 may be a central processing unit (CPU), a graphics processing unit (GPU), an advanced processing unit (APU) such as a general purpose graphics processing unit (GPGPU), and the like. For simplicity and consistency, the disclosure will be discussed with respect to a GPU. However, it will be understood that other processing elements may be used without departing from the disclosure. In some embodiments, the GPU 105 is capable of supporting multiple local thread groups.

The illustrated graphics processor 105 includes a hardware global barrier 140 that is used to synchronize the workload, i.e., threads 112a-112n, 114a-114n, across the one or more local thread groups 130a-130n, i.e., a global thread group, during execution of the workload. In some examples, the global barrier 140 may be implemented as a GPU or CPU core executing a global barrier 140 routine. While two thread groups are illustrated, the GPU may receive and execute a plurality of thread groups based on the circumstances, system requirements, and system limitations. The global barrier 140 may include, for example, instructions to extend a local barrier included in the GPU 105 and issue a command that indicates when the barrier is complete, i.e., that all the threads 112a-112n, 114a-114n have executed all required instructions. The global barrier 140 may then notify the system that the thread groups 112a-112n, 114a-114n have been completed. The global barrier 140 may then synchronize the completed thread groups 112a-112n, 114a-114n, and launch any remaining kernels required to complete the workload. The illustrated global barrier 140 allows multiple thread groups 112a-112n, 114a-114n required to perform a workload to run in parallel and be executed concurrently on the various local thread groups 130a-130n thereby providing a more efficient use of system resources and significantly reducing execution runtimes.

Local barriers may be useful for synchronization within one thread group or work group item. If synchronization, however, is required across thread/work groups a global barrier may be needed. Global barriers may require that all thread/work groups be loaded into the target system to enable their use. Local barriers may be used when the data is both produced and consumed by one or more threads within the thread group. In the use of a local barrier, the data is first produced by all threads and then a local barrier is set. After all threads complete executing, the barrier is lifted and the threads may proceed executing further from the barrier. The local barrier, however, is enabled only within a thread group. In many instances there could be data to be produced and consumed across thread groups. In these instances, local barriers cannot be used and a barrier across thread groups, i.e., a global barrier, is needed. In such an instance, a global barrier may be set marking the local thread groups that require a global barrier to communicate across them. Utilizing a global barrier, all thread groups may execute in parallel until they reach the global barrier, where the global barrier may send a global barrier message from all threads within all thread groups which need to communicate. Once all the thread groups have synchronized by executing the global barrier, the hardware may indicate that they can proceed further execution on all threads.

Accordingly, rather than relying on a local barrier to ensure that all the threads across thread groups required by a workload have been completed, the illustrated graphics processor 105 utilizes a hardware global barrier 140 that allows the workloads to be distributed over multiple local thread groups 130a-130n for concurrent, parallel processing. The hardware global barrier 140 confirms that each of the multiple thread groups 112a-n, 114a-n has been completed. For example, a thread group may be defined by an application programming interface (API). The code associated with the API may be set to compile at runtime. A kernel may be run on the GPU to work on a certain set of data and to generate a certain set of data. The kernel executes to issue thread groups, e.g., thread groups 1, 2, 3, and 4. After some time, data generated by one thread group will be needed by another or multiple threads in another thread group, e.g., data generated by threads in work group 1 is needed by threads in work group 2, data generated by threads in work group 2 is needed by threads in work group 1-4, and data generated by threads in work group 3 is needed by threads in work group 4. The local barrier provides notification of thread completion such that the execution of the remaining threads within the work group can proceed. The local barrier may only support the execution of barrier messages within the same thread or work group.

On the other hand, the global barrier 140 (e.g., if there are multiple work groups that need to produce data to be consumed by all of them), the program might be split into two halves. The first half may execute all thread groups until reaching the global barrier 140, and then return to the CPU to synchronize between all thread groups before the second half is executed. There may be other more complex cases where the CPU may intervene to provide the synchronization across work groups. If the global barrier 140 is supported, this functionality may be handled by the hardware of the global barrier 140 and CPU intervention might be avoided with regard to synchronizing across work groups. The illustrated hardware global barrier 140 allows the workload to be partitioned over multiple kernels 110 to form a plurality of threads 112, 114 that may be concurrently executed in parallel and synchronized upon completion. The hardware global barrier 140 thereby provides an efficient use of system resources and significantly reduces the workload execution runtime. The hardware global barrier 140 also allows better utilization of caches within the GPU 105 and thereby provides better performance and power for applications. This also allows for tiling the workload so that it can fit into the cache and thereby split the workload such that it spans across the GPU 105 compute resources with multiple thread groups working together. Further, the hardware global thread barrier 105 allows for global synchronizing before proceeding with the next set of tile regions.

In at least one embodiment, the system 100 determines when multiple local threads have been launched, for example, by utilizing a local barrier defined in the GPU 105. Upon detection of multiple local threads being launched, the system 100 may assume that these local threads are a part of a global thread group that has to fit within the GPU 105, i.e., the GPU 105 has sufficient processing resources to handle the entire global thread group. The global barrier 105 helps to ensure that all the threads fit into the targeted device, i.e., the GPU 105. The system 100 may query the GPU 105, for example, via querying logic 103 in order to determine the number of thread groups supported by the system 100. The query may include, for example, the number of threads in the group, the capacity of the GPU, and the like, in order to determine the number of threads the system 100 can support. As an example, typical GPUs support up to 1,024 ($\approx$1K) threads in a thread group. The query result will reveal the number of thread groups that may be supported. For example, if the query reveals that four thread groups may be supported, a global thread group would support four thread groups. The system 100 may then establish a global thread group having four local thread groups and a global barrier may be defined to synchronize across the four local thread groups.

When the system 100 determines that all the thread groups fit within the GPU 105, as opposed to executing the instructions as separate programs, the thread groups 112a-n, 114a-n may be executed as a single program having a global barrier between the thread groups for synchronization across the thread groups. In some embodiments, there may be multiple global thread groups within the system 100, e.g., global thread group 1 and global thread group 2. In at least one example, the global barrier 140 requires that the local and/or global thread groups be completed before proceeded to the next local and/or global thread group, respectively. This may be accomplished by, for example, issuing a notification indicating completion of the thread group. The notification may be executed in hardware as an instruction that notifies that controls the barrier. As an example, the instruction may include a tag indicating that the instruction is assigned to the barrier to check for an identification (ID) tag. The hardware may then increment accordingly to determine if the threads for that particular thread group have been completed. The notification thereby allows the system 100 to avoid a timely polling process (associated with the thread groups retiring) in order to determine that all threads in a thread group have been completed.

The hardware global barrier 105 is supported in hardware and can be enabled by a hint to the software by the application when the use of the global barrier is desired. In some examples, the host processor 101 may include querying logic 103 to determine the condition of the software. The application programming interface (API) or driver may perform a check to determine if the global barrier can be achieved before enabling the feature in hardware. Otherwise, the system may use software global synchronization. Global synchronization may involve waiting for all thread groups to complete for global barrier to be successful. The software can determine the condition by querying the device, as follows:

```
No of Compute devices - Ncompute
No of threads per compute devices - Nthread
Local thread group size - Nlocal_size
Global thread group size - Nglobal_size
If (Ncompute*Nthread>=Nlocal_size*NGlobal_size)
    Enable_global_barrier_inHW = TRUE
Else
    Enable_global_barrier_inHW = FALSE
```

The global barrier check may generally be performed across the thread groups, as follows:
1. The thread indicates that the Global Barrier Check is required (or Local Barrier Check) and WAIT until a Global Barrier Check done is returned by the hardware
2. The thread indicates which Global Thread Group ID it belongs to (or Local Thread Group ID)
3. The Global Thread Group ID can be the same as the Local Thread Group ID
4. The number of threads in the Global Thread Group which need to complete before the Global Barrier done can be indicated to all the threads
5. Once the Global Barrier Check done is returned, the thread proceeds to do the remaining part of the kernel.

Figure 2:
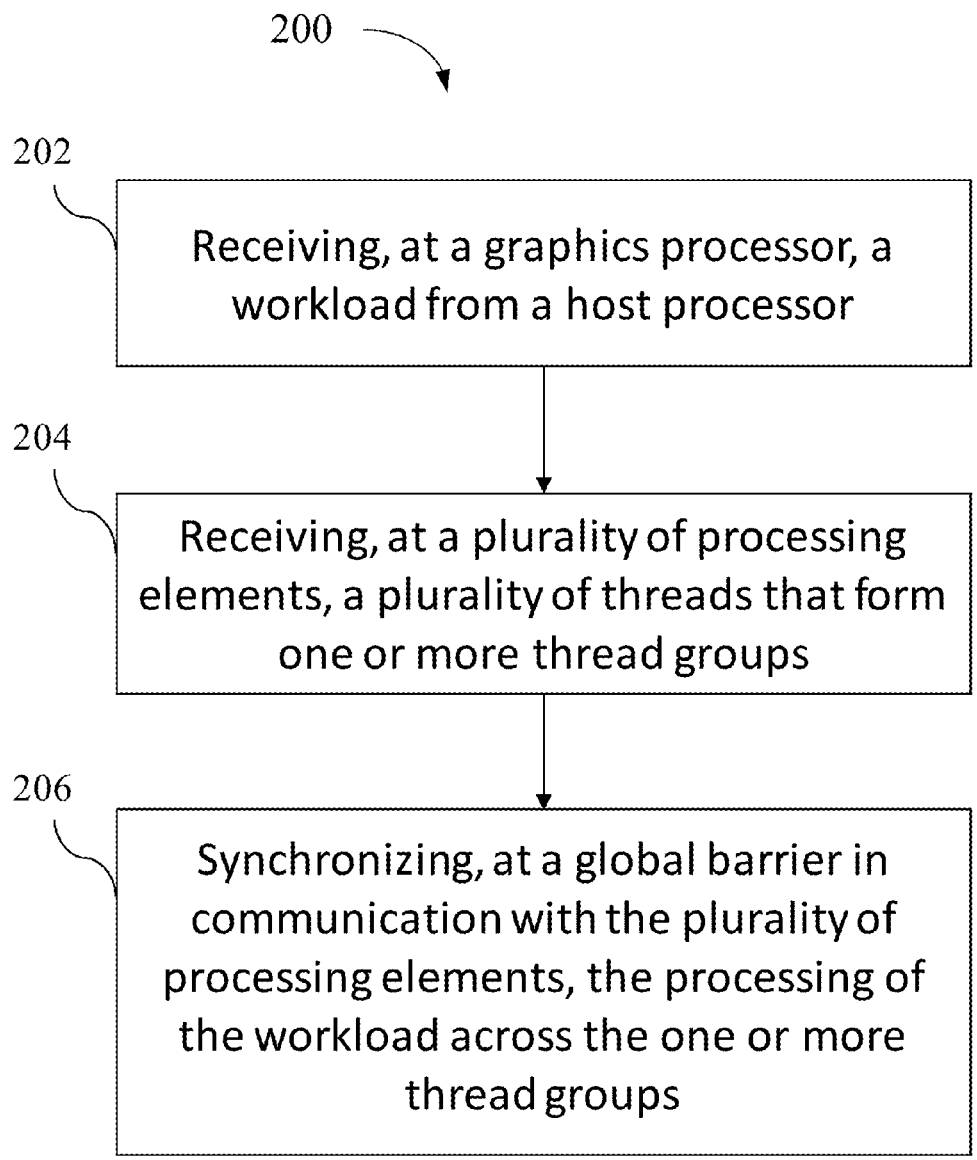
FIG. 2 is a flowchart of an example of a method of utilizing a global barrier to synchronize a workload across one or more thread groups.

Turning now to FIG. 2, a method 200 of synchronizing the processing of a workload across multiple thread groups is shown. The method 200 may be implemented in executable software as a set of logic instructions stored in a machine- or computer-readable storage medium of a memory such as random access memory (RAM), read-only memory (ROM), programmable ROM (PROM), firmware, flash memory, etc., in configurable logic such as, for example programmable logic arrays (PLAs), field programmable gate arrays (FPGAs), complex programmable logic devices (CPLDs), infix functionality logic hardware using circuit technology such as, for example, application-specific integrated circuits (ASIC), complementary metal oxide semiconductor (CMOS) or transistor-transistor logic (TTL) technology, or any combination thereof. For example, computer program code to carry out operations shown in method 600 may be written in any combination of one or more programming languages including an object-oriented programming language such as Java, Smalltalk, C++ or the like and conventional procedural programming languages, such as the "C" programming language or similar programming languages.

At 200, the method receives, at a graphics processor, a workload from a host processor. The workload may be partitioned into a plurality of threads. At 202, receiving, at a plurality of processing elements, a plurality of thread that form one or more thread/work groups. The plurality of processing elements may be arranged into one or more local thread/work groups. The workload may be executed across the one or more local thread groups. At 206, synchronizing, at a global barrier in communication with the plurality of processing elements, the processing of the workload across the one or more thread groups. The one or more thread groups may form a global thread group. As discussed above, the global barrier allows the workload to be executed concurrently across the one or more thread groups thereby improving system efficiency.

In use, querying may be performed to determine the number of thread groups that may be supported by the system 100. The query results may reveal, for example, that four thread groups may be supported. Based on this determination, a global thread group having four local thread groups may be established. A global barrier may be defined by synchronizing across the four local thread groups. When executing a program the system may utilize the global barrier to form a global thread group such that the local thread groups may be executed concurrently, in parallel.

If we assume, for example, that a program has 100 lines of instructions and line 41 requires the thread from line 40 in order to proceed, a global barrier can be formed between lines 40 and 41 in order to allow the program to proceed with executing. Upon establishing the global barrier, the instructions can run as one program having two thread groups (i.e., 1-40 and 41-100). In this scenario, the system may receive notification upon all the thread groups completing. For example, the hardware may utilize the global barrier to issue a command that indicates that the barrier is complete and will notify the system that the thread groups have been completed. Therefore, polling and/or running multiple executions of instruction would not be required.

If, however, a global barrier is not supported by the system, a global barrier cannot be established across the thread groups. Other options for executing the program may be utilized. In one option, the program could be run as two separate programs. In this case, the original kernel containing lines 1-100 may be split into two kernel, one containing lines 1-40 and a second containing lines 41-100. For example, lines 1-40 may be executed as one program and lines 41-100 may be executed as a second program. This option, however, requires that all the threads for lines 1-40 be allowed to retire before proceeding with the second program including lines 41-100. Line 41 would be allowed to proceed only after retirement of all threads launched up to the $40^{th}$ line of instruction. If it is assumed that there were 100 threads that were launched having the 40 lines of instruction, polling must be performed to determine if all 100 of the 40 lines of instruction have completed. Upon completion of threads 1-40, another 100 threads having lines 41-100 may be executed as a second program. Polling must be performed again to determine that all 100 of the lines 41-100 have been completed. This process helps to ensure that all the data has been stored to memory. However, this process results in substantial delays due to, for example, increased notification wait times, longer runtimes, and longer launch times.

In the second option, an atomic operation may be utilized to count the threads. This option does not required that each thread be retired, but continual polling is required. An atomic operation may be utilized as a counter to increment (i.e., count) the completion of the threads. For example, a memory may be written with a specified location. The value of the memory location may then be incremented upon completion of each thread. When the count reaches 100, polling must be performed. After the $40^{th}$ line of instruction, polling of the particular address must be performed to determine if the count has reached 100. If the count has not reached 100, polling must be continued until the counter reaches 100 and all threads are complete. This process is very inefficient, includes substantial delays, and requires continuous polling.

Figure 3:
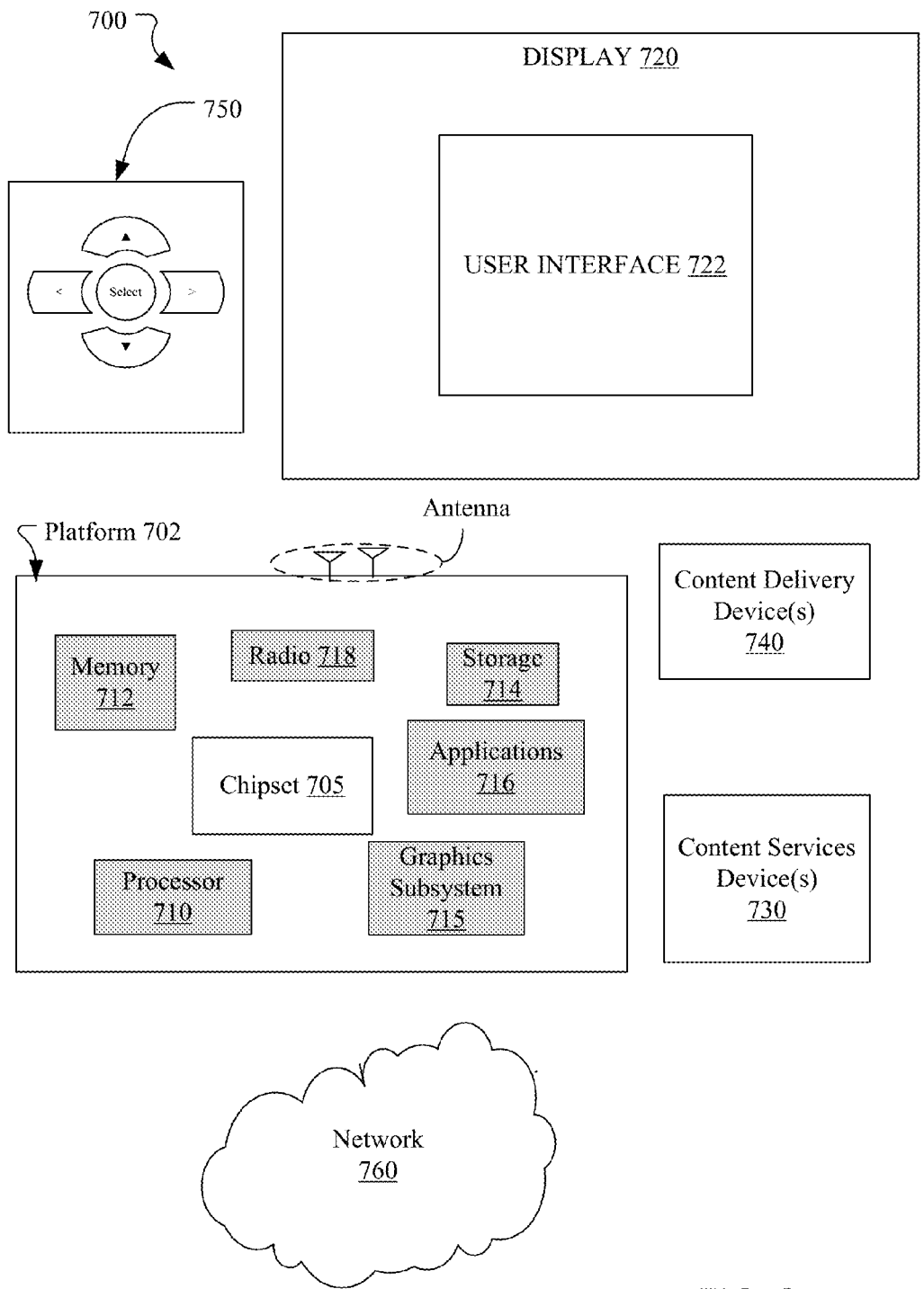
FIG. 3 is a block diagram of an example of a system having a navigation controller according to an embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to maintain cache coherency for video bitstreams as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the graphics processor 105 (FIG. 1), already discussed. In addition, the processor 710 may be configured to operate as the host processor 101 (FIG. 1), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version. In some examples, radio 718 may include one or more transceivers.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/or display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
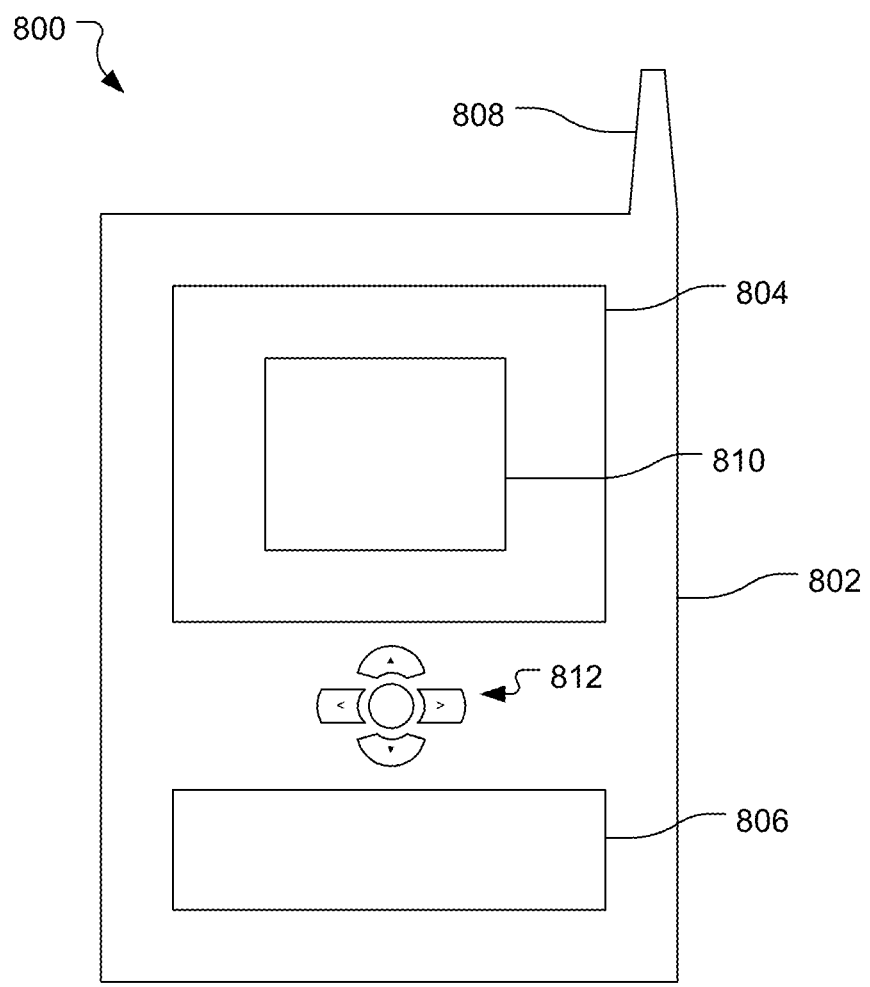
FIG. 4 is a block diagram of an example of a system having a small form factor according to an embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system for synchronizing the processing of a workload across a plurality of thread groups, having one or more transceiver, a processor, a system memory associated with the host processor, and a graphics processor in communication with the system memory. The one or more transceivers to provide a workload to the processor. The graphics processor to receive a workload from the host processor, the host processor including a plurality of processing elements, and a global barrier in communication with the plurality of processing elements. The plurality of threads form one or more thread groups. The global barrier synchronizes the processing of the workload across the one or more thread groups.

Example 2 may include the system of example 1, wherein the plurality of processing elements are arranged into one or more local thread groups.

Example 3 may include the system of example 1, wherein the workload is executed across the one or more thread groups.

Example 4 may include the system of example 1, wherein the workload is partitioned to form a plurality of threads.

Example 5 may include the system of example 1, wherein the one or more local thread groups form a global thread group.

Example 6 may include the system of example 1, wherein the global barrier determines that all threads across the thread groups have been completed.

Example 7 may include the system of example 6, wherein the determination is made without polling.

Example 8 may include the system of claim 1, wherein the processor is a graphics processor.

Example 9 may include an apparatus for synchronizing the processing of a workload across a plurality of thread groups having a graphics processor to receive a workload from a host processor. The graphics processor may include a plurality of processing elements and a global barrier. The graphics processor may receive at least one of a plurality of threads, the plurality of threads to form one or more thread groups. The global barrier may be in communication with the plurality of processing elements and may synchronize the processing of the workload across the one or more thread groups.

Example 10 may include the apparatus of example 9, wherein the plurality of processing elements are arranged into one or more local thread groups.

Example 11 may include the apparatus of example 9, wherein the workload is executed across multiple local thread groups.

Example 12 may include the apparatus of example 9, wherein the workload is partitioned to form a plurality of threads.

Example 13 may include the apparatus of example 9, wherein the one or more local thread groups form a global thread group.

Example 14 may include the apparatus of example 9, wherein the global barrier determines that all threads across the local thread groups have been completed.

Example 15 may include a method for synchronizing a workload the processing of a workload across a plurality of thread groups, the method including receiving, at a graphics processor, a workload from a host processor, and receiving, at a plurality of processing elements, a plurality of threads that form one or more thread groups. The method may further include synchronizing, at a global barrier in communication with the plurality of processing elements, the processing of the workload across the one or more thread groups.

Example 16 may include the method of example 15, wherein the plurality of processing elements are arranged into one or more local thread groups.

Example 17 may include the method of example 15, wherein the workload is executed across the one or more local thread groups.

Example 18 may include the method of example 15, wherein the workload is partitioned into a plurality of threads.

Example 19 may include the method of example 15, wherein the one or more local thread groups form a global thread group.

Example 20 may include the method of example 15, wherein the global barrier determines that all threads across the local thread groups have been completed.

Example 21 may include at least one computer readable storage medium having an application or workload which, if executed by a host processor, issues commands to a processing unit. The application, if executed, may also cause commands to be dispatched to the processing unit to receive a workload from the processor. The processing unit may receive, at a plurality of processing elements, a plurality of threads that form one or more thread groups, and synchronize, at a global barrier in communication with the plurality of processing elements, the processing of the workload across the one or more thread groups.

Example 22 may include at least one computer readable storage medium of example 21, wherein the plurality of processing elements are arranged into one or more local thread groups.

Example 23 may include at least one computer readable storage medium of example 20, wherein the workload is executed across the one or more local thread groups.

Example 24 may include at least one computer readable storage medium of example 20, wherein the workload is partitioned into a plurality of threads, and the one or more local thread groups form a global thread group.

Example 25 may include at least one computer readable storage medium of example 20, wherein the global barrier determines that all threads across the local thread groups have been completed.

Example 26 may include an apparatus comprising means for performing the method of any of examples 15 to 20.

Thus, global barriers may be useful in cases where there is limited memory space and it is desirable to compute and use data confined to available cache while also utilizing the full compute possible in the system. Moreover, techniques described herein may reduce communication requirements with the CPU in case of global synchronization required and hence reduce power.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

We claim:
1. A system comprising:
one or more transceivers;
a host processor in communication with the one or more transceivers;
a system memory associated with the host processor;

a processor, in communication with the system memory, to receive a workload from the host processor, wherein the workload is partitioned into a plurality of kernels each containing a thread group, the processor including:
- a first plurality of processing elements to receive and process a first thread group having a plurality of threads, wherein each of the plurality of processing elements processes at least one of the plurality of threads, a second plurality of processing elements to receive and process a second thread group having a plurality of threads, wherein each of the plurality of processing elements processes at least one of the plurality of threads, and
- a global barrier in communication with the first plurality of processing elements and the second plurality of processing elements, the global barrier to enable the workload to be partitioned into the plurality of kernels and to synchronize the processing of the workload across the first thread group and the second thread group, wherein the plurality of kernels are to be processed concurrently and in parallel.

2. The system of claim 1, wherein the first thread group and the second thread group form a global thread group.

3. The system of claim 1, wherein the global barrier determines that all threads across the first thread group and the second thread group have been completed.

4. The system of claim 3, wherein the determination is made without polling.

5. The system of claim 1, wherein the processor is a graphics processor.

6. An apparatus comprising:
a graphics processor to receive a workload from a host processor, wherein the workload is partitioned into a plurality of kernels each containing a thread group, the graphics processor including:
- a first plurality of processing elements to receive and process a first thread group having a plurality of threads, wherein each of the plurality of processing elements processes at least one of the plurality of threads,
- a second plurality of processing elements to receive and process a second thread group having a plurality of threads, wherein each of the plurality of processing elements processes at least one of the plurality of threads, and
- a global barrier in communication with the first plurality of processing elements and the second plurality of processing elements, the global barrier to enable the workload to be partitioned into the plurality of kernels and to synchronize the processing of the workload across the first thread group and the second thread group, wherein the plurality of kernels are to be processed concurrently and in parallel.

7. The apparatus of claim 6, wherein the first thread group and the second thread group form a global thread group.

8. The apparatus of claim 6, wherein the global barrier determines that all threads across the first thread group and the second thread group have been completed.

9. A method comprising:
receiving, at a graphics processor, a workload from a host processor, wherein the workload is partitioned into a plurality of kernels each containing a thread group;
receiving, at a first plurality of processing elements, a first thread group having plurality of threads, wherein each of the plurality of processing elements processes at least one of the plurality of threads,
receiving, at a second plurality of processing elements, a second thread group having plurality of threads, wherein each of the plurality of processing elements processes at least one of the plurality of threads,
synchronizing, at a global barrier in communication with the first plurality of processing elements and the second plurality of processing elements, the processing of the workload across the first thread group and the second thread group, wherein the global barrier enables the workload to be partitioned into the plurality of kernels and the plurality of kernels are to be processed concurrently and in parallel.

10. The method of claim 9, wherein the first thread group and the second thread group form a global thread group.

11. The method of claim 9, wherein the global barrier determines that all threads across the first thread group and the second thread group have been completed.

12. At least one non-transitory computer readable storage medium comprising a set of instructions which, if executed by a graphics processor, cause a computer to:
receive, at a processor, a workload from a host processor, wherein the workload is partitioned into a plurality of kernels each containing a thread group;
receive, at a first plurality of processing elements, a first thread group having a plurality of threads, wherein each of the plurality of processing elements processes at least one of the plurality of threads,
receive, at a second plurality of processing elements, a second thread group having a plurality of threads, wherein each of the plurality of processing elements processes at least one of the plurality of threads,
synchronize, at a global barrier in communication with the first plurality of processing elements and the second plurality of processing elements, the processing of the workload across the first thread group and the second thread group, wherein the global barrier enables the workload to be partitioned into the plurality of kernels and the plurality of kernels are to be processed concurrently and in parallel.

13. The at least one non-transitory computer readable storage medium of claim 12, wherein the first thread group and the second thread group form a global thread group.

14. The at least one non-transitory computer readable storage medium of claim 12, wherein the global barrier determines that all threads across the first thread group and the second thread group have been completed.

* * * * *